(12) United States Patent
Sunila et al.

(10) Patent No.: US 11,856,417 B2
(45) Date of Patent: Dec. 26, 2023

(54) NETWORK MONITORING RELATED TO REMOTE ELECTRICAL TILT

(71) Applicant: Elisa Oyj, Helsinki (FI)

(72) Inventors: Karri Sunila, Helsinki (FI); Jussi Nieminen, Helsinki (FI)

(73) Assignee: Elisa Oyj, Helsinki (FI)

( * ) Notice: Subject to any disclaimer, the term of this patent is extended or adjusted under 35 U.S.C. 154(b) by 58 days.

(21) Appl. No.: 17/920,928

(22) PCT Filed: Apr. 21, 2021

(86) PCT No.: PCT/FI2021/050305
§ 371 (c)(1),
(2) Date: Oct. 24, 2022

(87) PCT Pub. No.: WO2021/219930
PCT Pub. Date: Nov. 4, 2021

(65) Prior Publication Data
US 2023/0189016 A1    Jun. 15, 2023

(30) Foreign Application Priority Data
Apr. 27, 2020    (FI) ...................................... 20205416

(51) Int. Cl.
*H04W 16/28* (2009.01)
*H04W 24/02* (2009.01)

(52) U.S. Cl.
CPC ........... *H04W 16/28* (2013.01); *H04W 24/02* (2013.01)

(58) Field of Classification Search
None
See application file for complete search history.

(56) References Cited

U.S. PATENT DOCUMENTS

| | | |
|---|---|---|
| 2010/0105398 A1 | 4/2010 | Engström |
| 2012/0157089 A1 | 6/2012 | Yang et al. |
| 2016/0165462 A1 | 6/2016 | Tan et al. |

FOREIGN PATENT DOCUMENTS

| | | |
|---|---|---|
| CN | 106937303 A | 7/2017 |
| EP | 2424040 A1 | 2/2012 |
| EP | 3258607 A1 | 12/2017 |
| WO | 2013111159 A2 | 8/2013 |

OTHER PUBLICATIONS

Finnish Patent and Registration Office, Search Report, Application No. 20205416, dated Nov. 2, 2020, 2 pages.

Notification of Transmittal of The International Search Report and The Written Opinion of The International Searching Authority, or The Declaration, Application No. PCT/FI2021/050305, dated Aug. 2, 2021, 13 pages.

*Primary Examiner* — Faruk Hamza
*Assistant Examiner* — Cassandra L Decker
(74) *Attorney, Agent, or Firm* — ZIEGLER IP LAW GROUP

(57) ABSTRACT

A computer implemented method of monitoring a communication network. The method includes obtaining first information related to remote electrical tilt configurations deployed in the communication network; obtaining second information related to cell documentation; comparing the first and second information to identify mismatches between the first and second information, if any; and outputting an alarm concerning mismatches identified as a result of the comparison.

10 Claims, 4 Drawing Sheets

← 401

| CELLID | RET_SER_NUM |
|---|---|
| L1069825 | AD006H22009IT--R1 |
| L1069828 | AD006H22009IT--Y1 |
| L532227 | AD006H22093T--R1 |
| L532230 | AD006H22093T--Y1 |
| L1069827 | AD006H22094T--R1 |
| L1069830 | AD006H22094T--Y1 |

402 ↙
403 ↙
404 ↙
405 ↙
406 ↙
407 ↙

411 ↙

| CF_SOLUTIONSITE | AZIMUT | ANTENNA_NAME | CF_SECTOR_ID | HEIGHT | DX | DY |
|---|---|---|---|---|---|---|
| L1069825 | 30 | MB4BMF_65_1610DDE_IN_ELS_0849_X1_07I | 1 | 68 | 0 | 0 |
| L1069828 | 30 | MB4BMF_65_1610DDE_IN_ELS_1710_06I | 1 | 68 | 0 | 0 |
| L532227 | 270 | MB4BMF_65_1610DDE_IN_ELS_0849_X1_02I | 3 | 47 | 0 | 0 |
| L532230 | 270 | MB4BMF_65_1610DDE_IN_ELS_1710_X3_05I | 3 | 47 | 0 | 0 |
| L1069827 | 290 | MB4BMF_65_1610DDE_IN_ELS_0849_X1_07I | 3 | 68 | 0 | 0 |
| L1069830 | 290 | MB4BMF_65_1610DDE_IN_ELS_1710_X3_06I | 3 | 68 | 0 | 0 |

| CELL | ALD_SERIAL_NBR |
|---|---|
| L161793 | 000Y101901201200333 |
| L161797 | 000Y201901201200333 |
| L161795 | 000Y101901201200837 |
| L161798 | 000Y201901201200837 |

502
503
504
505

511 ↗

| CF_SOLUTUNNISTE | AZIMUT | ANTENNA_NAME | CF_SECTOR_ID | HEIGHT | DX | DY |
|---|---|---|---|---|---|---|
| L161793 | 60 | T20065GR021_1805_X3_08T | 1 | 19 | 0 | 0 |
| L161795 | 60 | T20065GR021_2110_X4_08T | 1 | 19 | 0 | 0 |
| L161797 | 150 | T20065GR021_1805_X3_08T | 2 | 19 | 0 | 0 |
| L161798 | 150 | T20065GR021_2110_X4_08T | 2 | 19 | 0 | 0 |

NETWORK MONITORING RELATED TO REMOTE ELECTRICAL TILT

TECHNICAL FIELD

The present application generally relates to automated communication network monitoring and to remote electrical tilt.

BACKGROUND

This section illustrates useful background information without admission of any technique described herein representative of the state of the art.

Cellular communication networks are complex systems comprising a plurality of cells serving users of the network. When users of the communication network move in the area of the network, connections of the users are seamlessly handed over between cells of the network. There are various factors that affect operation of individual cells and co-operation between the cells. In order for the communication network to operate as intended and to provide planned quality of service, cells of the communication network need to operate as planned. For example, the cells need to provide sufficient coverage without too much interfering with operation of neighboring cells.

There are various automated measures that monitor operation of the communication networks in order to detect any problems in operation of the network as soon as possible so that operation of the network can be optimized. There is constant desire to develop methods that enable automation of the optimization actions or at least performing the optimization actions remotely without needing to visit base station sites. There may be a need to adjust antenna tilts, for example. Remote electrical tilt, RET, is a functionality that allows adjustment of antenna tilt remotely. Using RET in automated actions requires that the RET operates as intended.

SUMMARY

Various aspects of examples of the invention are set out in the claims. Any devices and/or methods in the description and/or drawings which are not covered by the claims are examples useful for understanding the invention.

According to a first example aspect of the present invention, there is provided a computer implemented method of monitoring a communication network. More particularly, monitoring of operation of remote electrical tilt is provided. The method comprises
  obtaining first information related to remote electrical tilt configurations deployed in the communication network;
  obtaining second information related to cell documentation;
  comparing the first and second information to identify mismatches between the first and second information, if any; and
  outputting an alarm concerning mismatches identified as a result of the comparison.

In an example embodiment, the first information comprises a plurality of entries comprising at least a cell id and a remote electrical tilt equipment identifier.

In an example embodiment, the first information comprises a plurality of entries comprising at least a cell id and an identifier of an antenna to which a remote electrical tilt equipment of said cell is connected to.

In an example embodiment, the second information comprises a plurality of entries comprising at least a cell id and associated antenna information.

In an example embodiment, the method further comprises rearranging at least one of the first information and the second information before the comparison.

In an example embodiment, said rearranging comprises grouping at least one of the first information and the second information by antenna instances.

In an example embodiment, said comparison comprises checking whether a remote electrical tilt equipment identifier points to several antennas.

In an example embodiment, said comparison comprises checking whether a low band remote electrical tilt equipment identifier points to an antenna port that belongs to high bands and whether a high band remote electrical tilt identifier points to an antenna port that belongs to low bands.

In an example embodiment, the first information is obtained from an operations support system of the communication network and the second information is obtained from a documentation system.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present invention have been illustrated in the foregoing paragraphs. The embodiments in the foregoing paragraphs are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:
FIGS. 4 and 5 illustrate certain example cases.

DETAILED DESCRIPTION OF THE DRAWINGS

Example embodiments of the present invention and its potential advantages are understood by referring to FIGS. 1 through 5 of the drawings. In this document, like reference signs denote like parts or steps.

Example embodiments of the invention provide mechanisms to monitor operation of cellular communication networks and to verify that remote electrical tilt, RET, functionality is properly set up. Certain example embodiments of the invention are based on certain type of automatic comparison between data from network systems and data from documentation systems. In this way, monitoring of operation of remote electrical tilt is provided. Further, example embodiments provide checking if remote electrical tilt equipment is correctly set up.

Tilting of antennas is a playing very important role in radio network optimization. With remote electrical tilt, RET, tilting can be automatized. In order for the optimization to work as intended also RET needs to operate as intended. Previously it has been generally trusted that RET is properly configured when the RET has been set up. Now it has been noticed that this is not always the case and RET may be accidentally misconfigured, but there has not been any systematic mechanism to detect where the RET operates properly and where RET is misconfigured.

If some of the RETs in the network are misconfigured, optimization that uses RET may lead to changes in wrong direction and/or to changes in wrong places and thereby deteriorate operation of the network. By means of various embodiments of present disclosure, it can be verified that RET is properly set up.

It is to be noted that in the following, mainly monitoring of a single network site is discussed, but clearly plurality of network sites may be monitored correspondingly in parallel or sequentially one after another.

Figure 1:
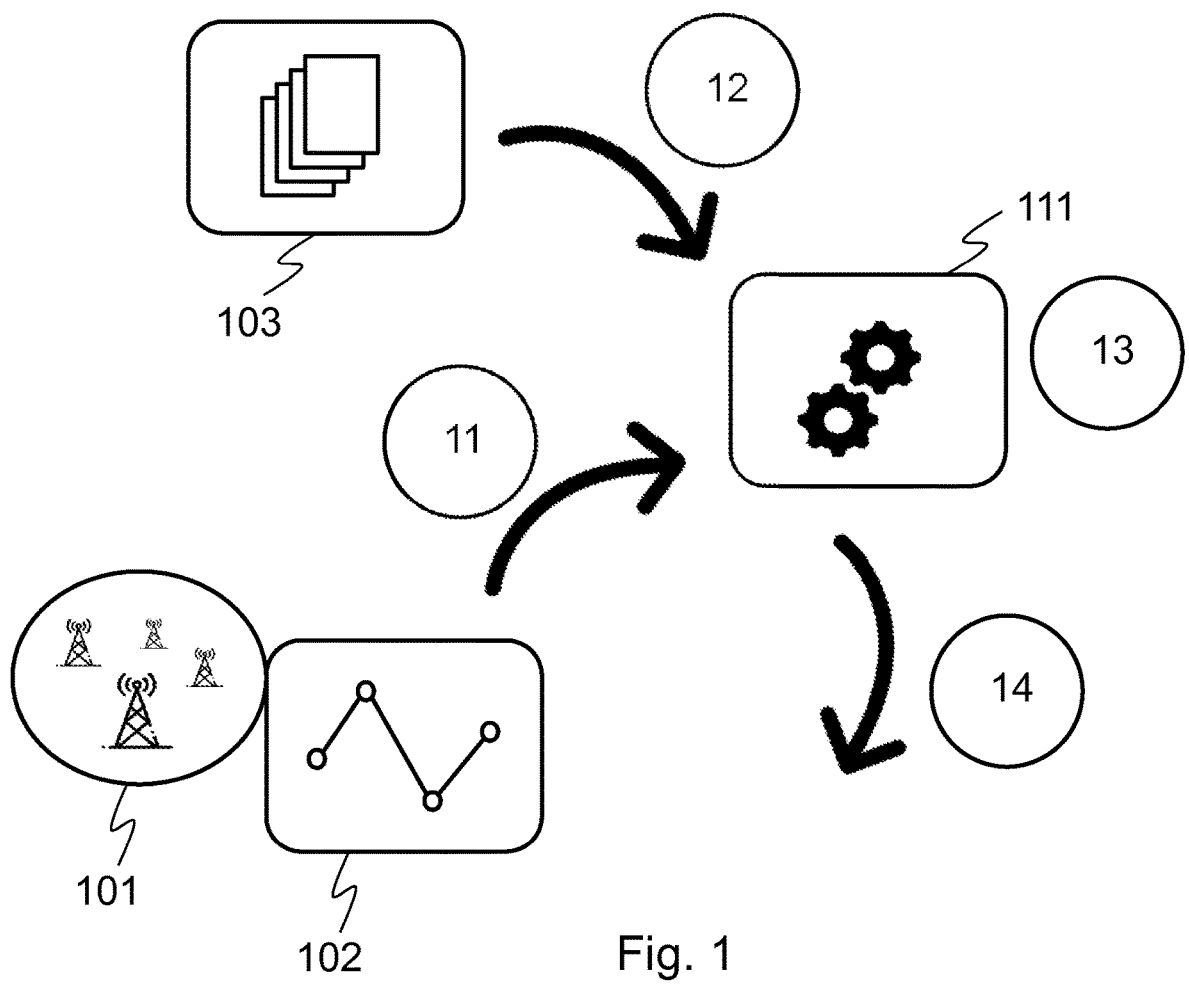
FIG. 1 shows an example scenario according to an embodiment.

FIG. 1 shows an example scenario according to an embodiment. The scenario shows a communication network 101 comprising a plurality of cells and base stations and other network devices, and an operations support system, OSS, 102 that manages operations of the communication network 101. Further, the scenario shows a documentation system 103 configured to store information related to the communication network 101, and an automation system 111 configured to implement automatic monitoring according to example embodiments. The documentation system 103 may store for example information about physical devices used in the communication network 101 and about structure of the communication network 101.

In an embodiment of the invention the scenario of FIG. 1 operates as follows: In phase 11, the automation system 111 obtains data from the OSS 102. The data comprises at least information associated with RET equipment deployed in the communication network 101. The data may comprise data related to one base station site or data related to a plurality of base station sites. Other data may be obtained from the OSS 102, too.

In phase 12, the automation system 111 obtains data from the documentation system 103. The data comprises at least information associated with cells and antennas of cells of the communication network 101. The data may comprise data related to one base station site or data related to a plurality of base station sites. Other data may be obtained from the documentation system 103, too.

The data obtained from the OSS and the documentation system is in general not identical and not comparable as such. In phase 13, the automation system 111 processes the data from the OSS and the data from the documentation system to rearrange the data into a format that allows comparison of the data from the different sources. The rearrangement of the data may concern for example certain reordering and regrouping of data. After the rearrangement the automation system 111 compares the data to check if there are mismatches in the data from the different sources.

The mismatches indicate deviation in remote electrical tilt configuration and thereby indicate that some correction is needed.

In phase 14, an alarm concerning identified mismatches is output for further actions such as for example maintenance actions at a base station site or corrections in the documentation system.

The process may be manually or automatically triggered. The process may be periodically repeated. The process may be repeated for example once a day, once a week, every two weeks, or once a month. By periodically repeating the process, effective network monitoring is achieved and problems, if any, may be timely detected. Additionally or alternatively, the process may be triggered, for example, in response to observing problems in the network. Still further, the process may be performed in connection with deployment of new cells or base station site, deployment of new physical equipment in the base station site and/or maintenance actions performed in the base station site. In this way any problems with the newly deployed equipment may be detected right away.

Figure 2:
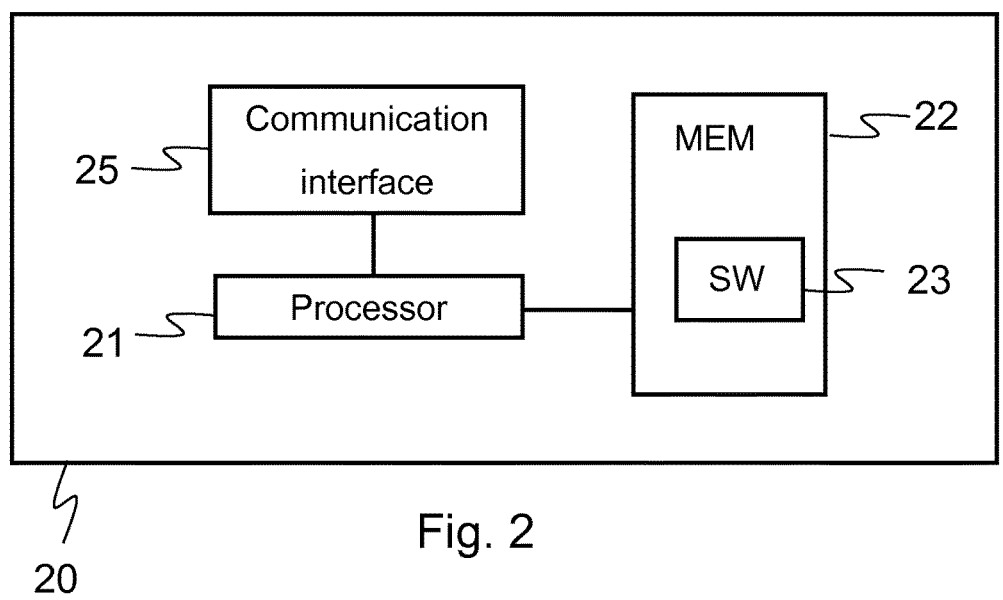
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the invention. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the invention may equally be implemented in a cluster of shown apparatuses.

Figure 3:
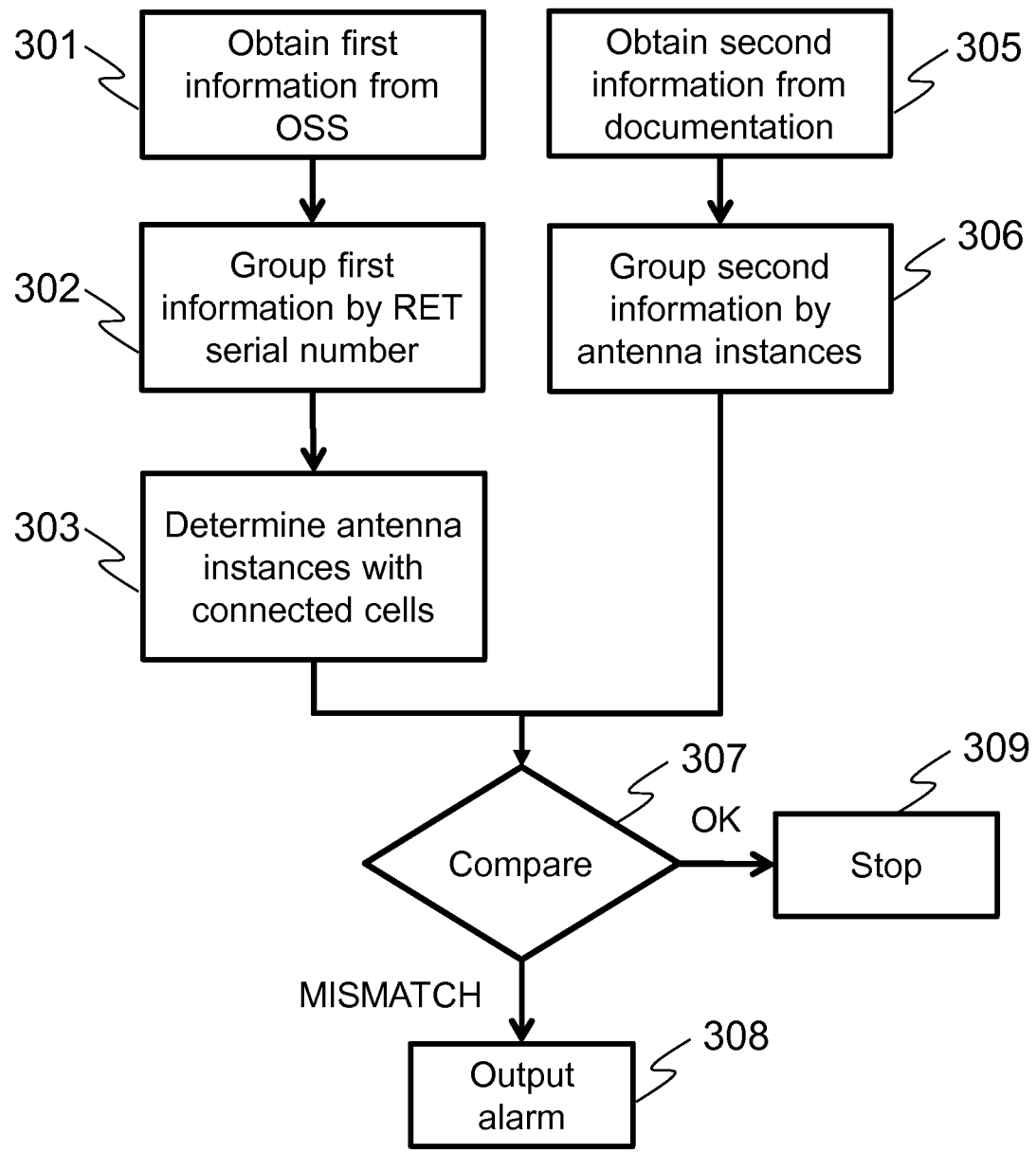
FIG. 3 shows a flow diagram illustrating example methods according to certain embodiments.

FIG. 3 shows a flow diagram illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in FIG. 3 may be combined with each other and the order of phases may be changed except where otherwise explicitly defined. Furthermore, it is to be noted that performing all phases of the flow charts is not mandatory.

The method of FIG. 3 provides monitoring of a communication network, and comprises the following phases:

Phase 301: First information is obtained. The first information is obtained for example from an operations support system of the communication network.

The first information is related to remote electrical tilt configurations deployed in the communication network, i.e. to the actual implementation that is set up in the network. In an embodiment, the first information comprises a plurality of entries comprising at least a cell id and a remote electrical tilt equipment identifier. Additionally or alternatively, the first information comprises a plurality of entries comprising at least a cell id and an identifier of an antenna to which a remote electrical tilt equipment of said cell is connected to.

Phases 302 and 303: The first information is rearranged by grouping the information by antenna instances. In phase 302, the first information is grouped by remote electrical tilt, RET, serial numbers or other remote electrical tilt equipment identifiers, or by antenna identifiers. In phase 303, antenna instances and respective connected cells are determined based on the grouping performed in phase 302.

Phase 305: Second information is obtained. The second information is obtained for example from a documentation system of the communication network.

The second information is related to cell documentation. In an embodiment, the second information comprises a plurality of entries comprising at least a cell id and associated antenna information. The associated antenna information may comprise one or more of the following: antenna azimuth, antenna model, sector identifier, antenna height, DX offset, and DY offset. Each unique combination of antenna information creates one antenna instance.

Phase 306: The second information is rearranged by grouping the information by antenna instances.

Phase 307: The first and second information are compared to identify whether there are mismatches between the first and second information. In this way, it is checked if the remote electrical tilt configuration implemented in the network deviates from the remote electrical tilt configuration in documentation system.

Phase 308: If one or more mismatches are identified, an alarm is output. Based on the alarm, further actions may be performed. A ticket may be created to field mechanic to repair the RET configuration in case it is assumed that the configuration set up in the network is not right. Alternatively, a ticket may be created to network planner to correct network documentation in case it is assumed there is a problem in documentation. In yet another alternative, both of these tickets may be created in order to check both the configuration and the documentation.

Phase 309: If the comparison results in no mismatches, the process stops. In an embodiment, the method may output an indication of no mismatches to inform that there seems to be no problem with the RET.

In an embodiment, the comparison in step 307 comprises checking whether a remote electrical tilt equipment identifier points to several antennas. If it is detected that a remote electrical tilt equipment identifier points to several antennas, it is concluded that there is a mismatch.

In an embodiment, the comparison in step 307 comprises checking whether a low band remote electrical tilt equipment identifier points to an antenna port that belongs to high bands and whether a high band remote electrical tilt equipment identifier points to an antenna port that belongs to low bands. If either one of these is detected, it is concluded that there is a mismatch.

FIGS. 4 and 5 illustrate certain example cases.

FIG. 4 shows an example of first information 401 and an example of second information 411. The first information comprises entries 402-407. Each entry of the first information comprises a cell id and a remote electrical tilt equipment identifier (RET_SER_NUM).

The second information comprises entries 412-417. Each entry of the second information comprises a cell id (CF_SO-LUTUNNISTE) and antenna information comprising antenna azimuth, antenna name (including antenna model and other information), sector id, antenna height, DX offset and DY offset.

When the first information 401 is processed according to embodiments of the invention, it is identified that in the first information 401 the entries 402 and 403 (cells L1069825 and L1069828) are using a first antenna instance based on the remote electrical tilt equipment identifier (AD006H220091T in both entries). Likewise, entries 404 and 405 (cells L532227 and L532230) are using a second antenna instance and entries 406 and 407 (cells L1069827 and L1069830) are using a third antenna instance.

When the second information 411 is processed according to embodiments of the invention, it is identified that in the second information 411 the entries 412 and 413 (cells L1069825 and L1069828) are using a first antenna instance as the values of antenna azimuth, sector id, and antenna height are the same. Antenna model comprised in antenna name is the same, too, in entries 412 and 413. Likewise, entries 414 and 415 (cells L532227 and L532230) are using a second antenna instance and entries 414 and 415 (cells L069827 and L069830) are using a third antenna instance.

Now, when the first information 401 and the second information 411 are compared, it is detected that corresponding antenna instances for corresponding cells are found in the first information 401 and the second information 411. Therefore, it is concluded that there are no mismatches and the RET configurations are ok.

In addition to the checks discussed in FIG. 4, an additional check taking into account antenna element information (R1, Y1) in the remote electrical tilt equipment identifier of the entries of the first information 401 can be performed assuming that corresponding information is included in the second information. By such checking it can be checked whether a low band remote electrical tilt equipment identifier (e.g. R1) points to an antenna port that belongs to high bands and whether a high band remote electrical tilt equipment identifier (e.g. Y1) points to an antenna port that belongs to low bands.

Let's take for example the entry 412 in the second information 411 (cell L1069825) and let's assume that 800 MHz frequency is used (not shown in the table). The information about the used frequency can be compared with information in the antenna name field in the entry 412. The number 0849 in the antenna name refers to 849 MHz frequency. Based on this the frequency link is right. If 1800 MHz frequency is used in the cell L1069825 instead, the entry 412 would not be right since such entry indicates that an 1800 MHz cell is linked to an 800 MHz antenna. It is to be noted that antenna name field is a text field that may comprises information in different formats and different formats may be interpreted in different ways. Any check on frequency linkages performed in embodiments of the invention may be further based on information about supported frequency bands. Information about supported frequency bands is readily available in documentation system or network planning systems.

FIG. 5 shows an example of first information 501 and an example of second information 511. The first information comprises entries 502-505. Each entry of the first information comprises a cell id and an identifier of an antenna to which a remote electrical tilt equipment of said cell is connected to (ALD_SERIAL_NBR). It is to be noted that the example of FIG. 5 could use the remote electrical tilt equipment identifier the same way as the example of FIG. 4.

The second information comprises entries 512-515. Each entry of the second information comprises a cell id (CF_SO-LUTUNNISTE) and antenna information comprising antenna azimuth, antenna name, sector id, antenna height, DX offset and DY offset.

When the first information 501 is processed according to embodiments of the invention, it is identified that in the first information 501 the entries 502 and 503 (cells L161793 and L161797) are using a first antenna instance based on the antenna identifier (019061200333 in both entries). Likewise, entries 504 and 505 (cells L161795 and L161798) are using a second antenna instance (antenna identifier 019061200837).

When the second information 511 is processed according to embodiments of the invention, it is identified that in the second information 511 the entries 512 and 513 (cells L161793 and L161795) are using a first antenna instance as the values of antenna azimuth, sector id, and antenna height are the same. Likewise, entries 514 and 515 (cells L161797 and L161798) are using a second antenna instance.

Now when the first information 501 and the second information 511 are compared, it is detected that there is a mismatch in the antenna instances of the first information 501 and the second information 511. For example, cell L161797 belongs to the first antenna instance in the first information 501 and to the second antenna instance in the second information 511. That is, the first information 501 and the second information 511 do not have corresponding antenna instances for respective cells. Therefore, an alarm is raised.

Without in any way limiting the scope, interpretation, or application of the claims appearing below, a technical effect of one or more of the example embodiments disclosed herein is enabling improved network optimization as deviations in RET configurations can be quickly identified and responsively corrected. In this way validity of RET data can be improved and other automation rules can act on valid data.

Another technical effect of one or more of the example embodiments disclosed herein is ability to direct resources to correct places as network sites exhibiting deviations in RET configurations are identified. Likewise, network sites comprising appropriate RET configurations can be identified and therefore unnecessary network site visit to such sites can be avoided.

Another technical effect of one or more of the example embodiments disclosed herein is ability to verify that RET equipment is correctly set up and based on this information, it may be easier and more reliable to start using automatic network optimization that employs RET.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

The invention claimed is:

1. A computer implemented method of monitoring a communication network, the method comprising checking if remote electrical tilt equipment, RET, operates as intended to enable use of the RET in optimization actions, the method comprising
obtaining first information related to remote electrical tilt configurations deployed in the communication network;
obtaining second information related to cell documentation;
comparing the first and second information to identify mismatches between the first and second information, if any, wherein the mismatches indicate deviation in remote electrical tilt configuration; and
outputting an alarm concerning mismatches identified as a result of the comparison;
the method further comprising rearranging at least one of the first information and the second information before the comparison,
wherein said rearranging comprises grouping at least one of the first information and the second information by antenna instances.

2. The method of claim 1, wherein said comparison comprises checking whether the first information and the second information have corresponding antenna instances for respective cells, and upon detecting that corresponding antenna instances for respective cells are not found, concluding that there is a mismatch.

3. The method of claim 1, wherein the first information comprises a plurality of entries comprising at least a cell id and a remote electrical tilt equipment identifier.

4. The method of claim 1, wherein the first information comprises a plurality of entries comprising at least a cell id and an identifier of an antenna to which a remote electrical tilt equipment of a cell associated with the respective cell id is connected.

5. The method of claim 1, wherein the second information comprises a plurality of entries comprising at least a cell id and associated antenna information.

6. The method of claim 1, wherein said comparison comprises checking whether a remote electrical tilt equipment identifier points to several antennas, and upon detecting that the remote electrical tilt equipment identifier points to several antennas, concluding that there is a mismatch.

7. The method of claim 1, wherein said comparison comprises checking whether a low band remote electrical tilt equipment identifier points to an antenna port that belongs to high bands and whether a high band remote electrical tilt identifier points to an antenna port that belongs to low bands, and if either one is detected, concluding that there is a mismatch.

8. The method of claim 1, wherein the first information is obtained from an operations support system of the communication network and the second information is obtained from a documentation system.

9. An apparatus comprising
a processor, and
  a memory including computer program code; the memory and the computer program code configured to, with the processor, cause the apparatus to perform monitoring of a communication network, the monitoring comprising
  checking if remote electrical tilt equipment, RET, operates as intended to enable use of the RET in optimization actions;
  obtaining first information related to remote electrical tilt configurations deployed in the communication network;
  obtaining second information related to cell documentation;
  comparing the first and second information to identify mismatches between the first and second information, if any, wherein the mismatches indicate deviation in remote electrical tilt configuration; and
  outputting an alarm concerning mismatches identified as a result of the comparison;
  the method further comprising rearranging at least one of the first information and the second information before the comparison, wherein said rearranging comprises grouping at least one of the first information and the second information by antenna instances.

10. A non-transitory computer-readable medium comprising computer executable program code which when executed by a processor causes an apparatus to perform monitoring of a communication network, the monitoring comprising:
  checking if remote electrical tilt equipment, RET, operates as intended to enable use of the RET in optimization actions;
  obtaining first information related to remote electrical tilt configurations deployed in the communication network;
  obtaining second information related to cell documentation;
  comparing the first and second information to identify mismatches between the first and second information, if any, wherein the mismatches indicate deviation in remote electrical tilt configuration; and
  outputting an alarm concerning mismatches identified as a result of the comparison;
  the method further comprising rearranging at least one of the first information and the second information before the comparison,
  wherein said rearranging comprises grouping at least one of the first information and the second information by antenna instances.

* * * * *